(12) United States Patent
Sun et al.

(10) Patent No.: US 8,880,437 B1
(45) Date of Patent: *Nov. 4, 2014

(54) SYSTEM AND METHOD FOR INTEGRATING TRADING OPERATIONS INCLUDING THE GENERATION, PROCESSING AND TRACKING OF AND TRADE DOCUMENTS

(71) Applicant: JPMorgan Chase Bank, N.A., New York, NY (US)

(72) Inventors: Albert Kwang-Hwa Sun, Brooklyn, NY (US); Tak Ming Chan, Kwun Tong (HK); Jaqueline Layer, Dorset (GB); Nicole Gabrielle Rodriguez Toulis, New York, NY (US); Stephen Pan Cheung, Tsuen Wang (HK); Patrick Shu Pui Ko, Happy Valley (HK); Sammy Shun Yuen Fung, Kowloon (HK); Thomas William Halpin, Irvington, NY (US); Yoke Bee Yap, New York, NY (US); Zeno Fook Chuen Chow, Yeung Long (HK); Kelvin Yatsun Leung, Pelham, NY (US); Kwok Keung Yeung, Shatin (HK); Man Pui Tsim, Hong Kong (HK); Sol Solomon, Caufield (AU)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/965,775

(22) Filed: Aug. 13, 2013

Related U.S. Application Data

(63) Continuation of application No. 13/028,774, filed on Feb. 16, 2011, now Pat. No. 8,538,844, which is a continuation of application No. 09/495,393, filed on Jan. 31, 2000, now Pat. No. 7,945,492, which is a continuation of application No. PCT/US99/30976, filed on Dec. 23, 1999.

(60) Provisional application No. 60/113,561, filed on Dec. 23, 1998, provisional application No. 60/113,643, filed on Dec. 23, 1998.

(51) Int. Cl.
*G06Q 10/08* (2012.01)
*G06Q 30/06* (2012.01)

(52) U.S. Cl.
CPC .......... *G06Q 10/083* (2013.01); *G06Q 30/0635* (2013.01); *G06Q 10/087* (2013.01)
USPC ........................................................ 705/330

(58) Field of Classification Search
CPC ....................................................... G06Q 10/08
USPC ..................................................... 705/35–45
See application file for complete search history.

(56) References Cited

U.S. PATENT DOCUMENTS

| 5,710,889 | A | | 1/1998 | Clark et al. | |
| 5,717,989 | A | * | 2/1998 | Tozzoli et al. | ................... 705/37 |

(Continued)

FOREIGN PATENT DOCUMENTS

WO          9612242          4/1996

*Primary Examiner* — Thomas M Hammond, III
(74) *Attorney, Agent, or Firm* — Hunton & Williams LLP (57) ABSTRACT

First and second components of the present invention, in combination, provide a customer interface for initiating a trade transaction and provides for the secure viewing of the status of the transaction. A third component assists in the automatic generation and verification of the voluminous and detailed documents required to support a trade transaction. The third component additionally tracks and assists in the management of the seller's manufacturing and shipment of the goods that form the basis of the trade transaction. A fourth component automatically generates a Letter of Credit from a Purchase Order and performs a reconciliation function on payments made pursuant to Letters of Credit or open Accounts.

11 Claims, 5 Drawing Sheets

(56) References Cited

U.S. PATENT DOCUMENTS

| | | |
|---|---|---|
| 5,787,402 A | 7/1998 | Potter et al. |
| 5,802,499 A | 9/1998 | Sampson et al. |
| 5,890,140 A | 3/1999 | Clark et al. |
| 6,058,378 A | 5/2000 | Clark et al. |
| 6,598,028 B1 | 7/2003 | Sullivan et al. |
| 6,629,081 B1 | 9/2003 | Cornelius et al. |
| 6,721,715 B2 | 4/2004 | Nemzow |
| 6,856,970 B1 | 2/2005 | Campbell et al. |
| 7,133,846 B1 | 11/2006 | Ginter et al. |
| 7,155,409 B1 | 12/2006 | Stroh |
| 7,167,844 B1 | 1/2007 | Leong et al. |
| 7,742,970 B2 | 6/2010 | Thierer |
| 7,983,616 B2 | 7/2011 | Wang et al. |
| 2001/0011241 A1 | 8/2001 | Nemzow |
| 2001/0056398 A1 | 12/2001 | Scheirer |
| 2002/0059093 A1 | 5/2002 | Barton et al. |
| 2002/0087454 A1 | 7/2002 | Calo et al. |
| 2002/0087455 A1 | 7/2002 | Tsagarakis et al. |
| 2003/0065594 A1 | 4/2003 | Murphy |
| 2003/0139827 A1 | 7/2003 | Phelps |
| 2003/0191710 A1* | 10/2003 | Green et al. .................... 705/40 |
| 2006/0020783 A1 | 1/2006 | Fisher |
| 2006/0095358 A1 | 5/2006 | Viarengo et al. |
| 2006/0095374 A1 | 5/2006 | Lo et al. |
| 2008/0046263 A1 | 2/2008 | Sager et al. |
| 2009/0259547 A1 | 10/2009 | Clopp |
| 2009/0276305 A1 | 11/2009 | Clopp |

* cited by examiner

SYSTEM AND METHOD FOR INTEGRATING TRADING OPERATIONS INCLUDING THE GENERATION, PROCESSING AND TRACKING OF AND TRADE DOCUMENTS

RELATED APPLICATIONS

This application is a continuation of U.S. patent application Ser. No. 13/028,774, filed Feb. 16, 2011, which is a continuation of U.S. application Ser. No. 09/495,393, filed Jan. 31, 2000, entitled "System and Method for Integrating Trading Operations Including the Generation, Processing and Tracking of and Trade Documents" to Sun et al., which is a continuation of PCT Application No. PCT/US99/030976, filed Dec. 23, 1999, which claims priority to U.S. Provisional Patent Application Nos. 60/113,561, filed Dec. 23, 1998; and 60/113,643, filed Dec. 23, 1998. The entire disclosures of all of the foregoing applications are hereby incorporated by reference.

FIELD OF THE INVENTION

The present invention generally relates to systems and methods for managing trading operations and more particularly to a system and method for generating, processing and tracking documents and processes associated with import/export trading operations.

BACKGROUND OF THE INVENTION

Presently, the process of documenting a trading operation between a buyer and a seller is manually intensive and error prone. Typically, a trading operation begins with a buyer wanting to purchase goods from a seller and requesting a price quote for the goods. The buyer and seller negotiate the terms of the trade resulting in the price quote as well as the other terms and conditions the two parties agree upon as being the basis of the agreement. The buyer then issues a purchase order (PO) to the seller reflecting the agreed upon price quote and the terms and conditions. The PO specifies the essential components of the transaction such as the type, amount and price of the goods as well as other details such as the time and place of delivery. Although not always required, the next step in the traditional process is the issuance of a Letter of Credit (L/C) by a bank. The L/C is generated from and typically incorporates all of the agreed upon terms and conditions and all of the PO information. The L/C is essentially a guarantee of payment by the bank that issued the L/C (the issuing bank) if the seller complies with all of the terms and conditions of the L/C. Specifically, as banks deal in documents and not goods, the seller must present a complete set of documents that strictly comply with the L/C in order for the issuing bank to honor the L/C. The L/C is issued by the issuing bank based upon the credit worthiness of the buyer.

The PO and/or L/C is transferred to the seller who is then in a position to manufacture (or supply) and ship the goods requested by the buyer. Internally, upon receipt of the PO and/or L/C, the seller creates a Sales Order in order to document the sale. The Sales Order reflects the requirements of the PO and/or L/C. If the seller is a manufacturer, the Sales Order is used to generate a manufacturing specification sheet from which the actual goods are manufactured. If the seller is a distributor the Sales Order is used to generate a warehouse pick slip that is used to pick the goods to be shipped. Alternatively, the seller can use the PO and/or L/C from the buyer to generate its own PO that is issued to the actual manufacturer of the goods. Once the manufacturing process is sufficiently complete, the seller contacts a shipper/freight forwarder to arrange for the shipment of the goods. The seller sends the shipper shipping instructions from which the shipper generates a Bill of Lading and customs documents (if required).

When the seller has the goods available for shipment (either through manufacturing, picking from the warehouse or acquisition from the manufacturer) the seller generates all of the documents required by the PO and/or L/C. These documents typically include an invoice for the goods, packing slip, certificate of analysis and/or origin. Additionally, the seller at this point provides for the transportation of the goods, procures shipping insurance and files the required trade documentation with both the origin and destination government authorities. Once the goods have been shipped, all of the trade documents required by the PO and/or L/C are presented for negotiation to the issuing bank (or another negotiation bank acting on the issuing bank's behalf).

As is readily seen from the above description, the process required to document a trading operation involves many parties generating many documents from the same redundant purchase information from the buyer that is entered in the systems of the bank, the seller and other trading partners, and is therefore susceptible to error and gross inefficiencies. These errors in the documentation lead to delays throughout the process including delays in the shipment of the goods. Any such errors result in the delay of receipt of the goods by the buyer and delay of receipt of payment by the seller. It is clear that all of the parties to the transaction would benefit from a system and method which reduces the number of errors in the documentation.

Since this documentation process is not part of an exporter's or an importer's core business (i.e., buying and selling goods) many exporters and importers are now outsourcing the documentation and tracking operations to third parties. Furthermore, since there is a certain level of risk exposure in the letter of credit collection process, many customers are looking to banks to assist them in their letter of credit fund collection.

SUMMARY OF THE INVENTION

In light of the above limitations of the prior art systems and methods, it is an object of the present invention to provide buyers, sellers, trading partners, their global affiliates, agents and supply chain service providers (e.g., shippers) with an automated facility in which all of the information associated with a trade is electronically exchanged and accessed via the Internet, third party network (Value Added Network, VAN), leased line or through dial up connection.

It is a further objective to automatically generate the documentation required for the trade from the trade agreement or instrument (e.g., Letter of Credit or Purchase Order).

It is also an object of the present invention to assist exporters (sellers) in monitoring their contractual agreements, assist in managing their production of goods and managing their risk exposure as well as providing an exporter with integrated treasury management services.

It is additionally an object of the present invention to assist importers (buyers) in monitoring their contractual agreements (e.g., outstanding obligations under Letters of Credit), providing information to assist in managing their inventory, and managing their contingent liability as well as providing an importer with integrated treasury management services.

In a preferred embodiment, the systems and methods of the present invention are operated and executed by a bank, but in practice, portions of the systems and methods can be operated and executed by any party. Although the present description of the present invention is made with respect to a bank, it should not be interpreted to be limited to a banking environment.

The present invention consists of four main components, TradeEDI, Trade Manager, TradeDoc and a Financial System. TradeEDI provides an electronic interface and gateway (e.g., secure Internet connection) to the system for customers. Trade Manager provides a customer interface for initiating and tracking of the status of a trade transaction. TradeDoc is primarily used on behalf of exporters (sellers/manufacturers) and supply chain service providers to assist in the generation of the voluminous and detailed documents required to support a trade transaction as well as to track and assist in the management of the seller's manufacturing/picking/procurement and shipment of the goods that form the basis of the trade transaction.

The trading operation is typically started by a buying party who is a customer of the bank. The buyer transmits a Purchase Order (PO) and/or Letter of Credit (L/C) application utilizing either Trade EDI or Trade Manager. The PO and/or L/C is transmitted either by electronic means or by paper (which is then keyed in or scanned at the bank). The PO and/or L/C represents the terms and conditions that the buyer and seller have agreed upon as governing the trade transaction (e.g., type and quantity of goods, unit price, delivery date and place ... ) If requested, the system of the present invention can automatically generate an L/C from a supplied PO. Such a generated L/C goes through the normal approval process within the bank.

Once the PO and/or L/C is verified against the customer's profile, it is mapped into a database in the Financial System which in turn feeds a database maintained by Trade Manager. The database can either be relational, object oriented or a combination of both. From this point forward in the entire trade process, all of the parties to the trade transaction are able to log onto Trade Manager and quickly determine the status of any particular trade operation. In a preferred embodiment of the present invention, users employ a standard browser and the Internet to communicate with Trade Manager. Standard security techniques such as encryption and authentication and non-repudiation are used to provide confidential communications and to ensure proper identification of the parties over the Internet an other electronic communication media. The use of the Internet is an incredible advantage of the present invention since most trading operations involve parties which are distributed worldwide. For example, the buyer might be in Texas, the seller might be in Singapore, the buyer's bank might be in New York and the seller's bank might be in London. Using the present invention. Any of the parties can access Trade Manager 150 through the Internet and instantly find out the status of the trade operation. Additionally, TradeEDI can exchange the information (e.g., push the information) via an electronic message through the Internet or other communication media to the buyer seller or their respective trading partners as the trade transaction is being processed in the Financial System or TradeDoc.

The other significant part of the present invention is TradeDoc. As described above, in the traditional prior art approach, all of the documentation related to the trade transaction was generated manually from paper files. This manual generation is significantly labor intensive and error prone. As often said, the devil is in the details. Unfortunately, an error in the details with respect to a trade operation can extremely costly both in terms of delayed or lost revenues, but more importantly from a relationship point of view between a buyer and a seller. Even if a seller has significantly better products, buyers are not willing to deal with the seller if the seller cannot manage the administrative details of the documentation a deliver the requested goods on time. The present invention solves all of these problems of the prior art by automatically generating a verifying all of the documentation at each step of the seller process.

TradeDoc is a facility that can generate trade documents in accordance with the terms and conditions of an L/C or PO (in an Open Account transaction). TradeDoc's facilitates trade document processing for global supply chain customers where the buyer is customer of the bank and the seller may or may not be a customer of the bank. Trade Doc also generates the proper trade documents in a trade transaction for the seller when the seller is a customer of the bank and the buyer may or may not be a bank customer. TradeDoc maintains a comparable database to that maintained by Trade Manager and is therefore capable of generating a Sales Order for seller using the details contained in the L/C and/or PO. Alternatively, if the seller generates the sales order itself, TradeDoc compares the Sales Order to the L/C or PO to verify its accuracy. In a similar fashion, TradeDoc is capable of either generating or verifying manufacturing specification sheets, invoices, shipping instructions, insurance instructions, drafts, beneficiary certificates and Bills of Lading and virtually any other trade documents required for the seller to satisfy the L/C or PO. As the generation and verification operations performed by TradeDoc are all executed from the initiated purchase information of the L/C and/or PO in the same common database, all of the opportunity for error in the documentation is eliminated. Once the manufacturing has been completed and the goods are ready for shipment, TradeDoc generates all of the final export documents required to complete the transaction. TradeDoc can remotely print the completed documents at a location closest to the buyer or the buyer's bank to facilitate the collection process. In an alternative embodiment, all of the trade documents are transmitted to the receiving partner electronically. This embodiment is becoming more and more prevalent in electronic commerce transactions (e.g., electronic marketplace).

Each of TradeDoc, TradeEDI and Trade Manager are integrated systems that allow the customers of the bank to permit their trading partners to view the trade documents. Trade Manager provides viewing of trade documents generated by TradeDoc on a browser via the Internet. Based on the customer's profile, some trading partners are provided with the authorization to print documents. TradeEDI can receive or send electronic documents to trading partners based on the agreement of the customer which s reflected in the customer's profile.

The present invention further provides reconciliation functions for both the buyer and the seller. When the trade documents are presented for negotiation, the system informs the buyer's accounts payable systems of the payment and correlates the invoice from the seller to the L/C or PO issued by the buyer. Similarly, when a payment is received from they buyer, the present invention is capable of performing a reconciliation process by which the payment is reconciled against the seller's accounts receivables (e.g., invoiced items). In this manner the present invention is able to assist in every aspect of the trading operation, from initiation to collection while solving all of the above described problems of the prior art.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

Figure 1:
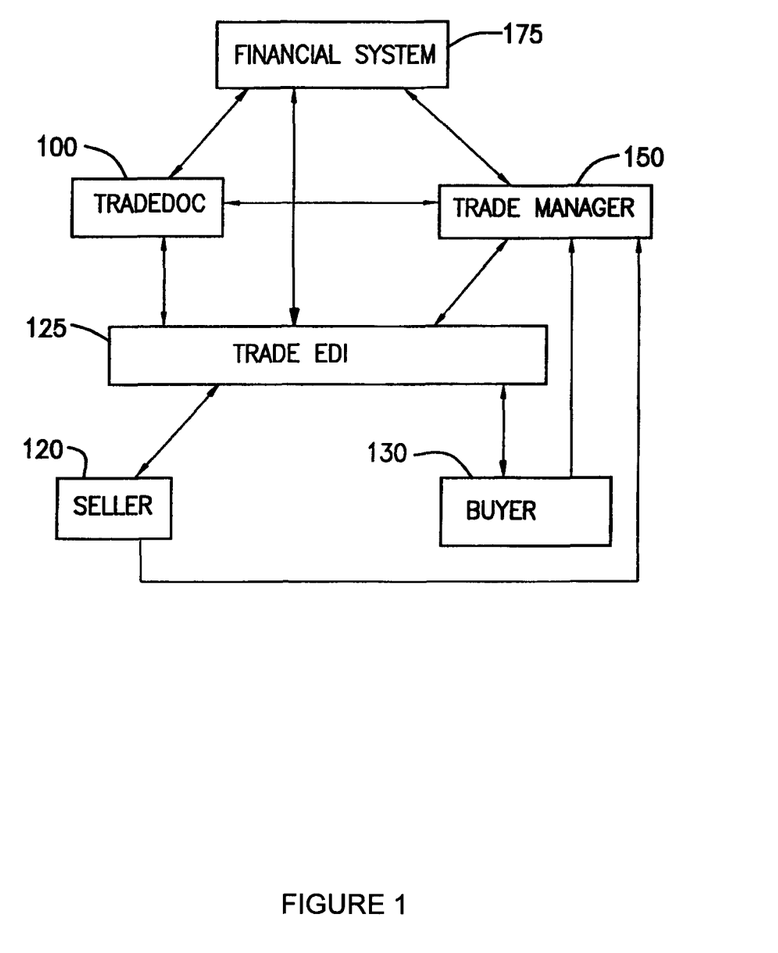
FIG. 1 illustrates the main components of the system of the present invention.

FIG. 1 illustrates the main components and dataflow of the system and method of the present invention. Element 100 is the TradeDoc element which includes the facilities for trade document preparation and generation. Element 150 is the Trade Manager element which provides tracking and communication services throughout the entire trade cycle. Element 125 is TradeEDI provides the electronic gateway and interface to secured exchange of information among customers and their trading partners via the Internet or other electronic communication media. Element 175 represents the Financial System 175 of a financial institution such as a bank. The Financial System 175 provides the tradition financial processing services such as the approval and generation of a Letter of Credit (L/C) or Open Account transaction and the payment and receipt of funds pursuant to the L/C or Open Account. Elements 120 and 130 respectively represent the Seller 120 and Buyer 130 in the trade transaction.

In a preferred embodiment, each of TradeDoc 100, Trade Manager 150 and the Financial System 175 is hosted and operated by a financial institution (e.g., a bank) and consist of a combination of software and hardware. Due to the scalability and various processing models (e.g., satellite and hub processing or distributive processing), Financial System 175 can be implemented using either client server mainframe processing. The client server technology can use Internet web technology such as SUN Javasoft or Netscape Web Server, Java servlets, HTML/XML and Java for presentation and CORBA technology allows the processing application servers located at various sites to communicate with each other. This netcentric technology allows remote branches with limited telecommunication bandwidth to access and initiate transactional information. In addition, the hub site can process using either UNIX or PC/NT servers using the C++ programming language and relational databases (e.g., Sysbase, Oracle or other similar relational database technology) to handle transaction processing and Visual Basic and Visual C++ on client workstations at the hub site. Alternatively, Financial System 175 can be implemented using traditional mainframe computer systems such as an IBM System 390. In each embodiment, the software operating as part of Financial System 175 includes custom software designed to carry out the functions described herein. In the banking environment, the Financial System 175 can include one centrally located facility or several geographically dispersed facilities such as in New York and London.

TradeDoc 100, TradeEDI 125 and Trade Manager 150 can be constituted by software executing on one or more mainframe systems or on one or more server systems. A mainframe system is one as described above with respect to the Financial System 175. In one embodiment of the present invention, TradeDoc 100, TradeEDI 125 and Trade Manager 150 operate on the same mainframe system as the Financial System 175. In a preferred embodiment of the present invention, TradeDoc 100, TradeEDI 125 and Trade Manager 150 utilize the same netcentric technology as described above with respect to the Financial System 175. Sun Javasoft or Netscape Web Server, Java servlets, HTML/XML and Java for presentation and CORBA technology for remote sites' application servers to communicate with each other. The application servers use commercially available netcentric technology with CORBA (e.g., WebLogics and Websphere). TradeEDI employs a commercially available EDI translator (e.g., Harbinger's OpenEDI, Gentran or others). Trade XML messages are used to facilitate message communications between the Financial System 175 and Trade Manager 150, TradeDoc 100 and TradeEDI 125. In each of the embodiments, Trade Manager 150, TradeEDI and TradeDoc 100 includes custom software programmed as described herein using the above described commercially available software.

In one embodiment, Financial System 175, Trade Manager 150 and TradeDoc 100 communicate with each other as illustrated in FIG. 1 by means of a corporate intranet. As the communications between Financial System 175, Trade Manager 150 and TradeDoc 100 involve sensitive financial information, the channels of the communication in the corporate intranet linking must provide a proper level of security. As is further illustrated in FIG. 1, both the Seller 120 and Buyer 130 each communicate with Trade Manager 150 and TradeDoc 100 through TradeEDI 125. In a preferred embodiment, the communication media between the Seller 120 or Buyer 130 and Trade Manager 150 and TradeDoc 100 is the public Internet. In this embodiment, the Seller 120 and Buyer 130 are each able to communicate with the system of the present invention using a standard Internet browser such as Netscape™ Navigator™ or Microsoft™ Explorer™, with TradeEDI 125 providing the proper encryption, authentication and non-repudiation required for secure financial communications. Alternatively the Seller 120 and Buyer 130 can connect to Trade Manager 150 or TradeDoc 100 using a leased line, third party network, or dial up line, again using TradeEDI 125 as the interface for secure communication.

The workstations employed by the Seller 120 and Buyer 130 are preferably any Internet ready device (e.g., personal computers (PCs), cellular phones with Internet capability or Personal Digital Assistants (PDAs) (hand held devices) that are Internet ready such as 3Com Palm V or VII). Alternatively, the Seller 120 and Buyer 130 workstations can be part of server or mainframe network system operated by or for the Seller 120 or Buyer 130. It will be recognized that the buyer and seller as well as other supply chain parties' workstations will contribute additional functionality to the processes associated with emerging e-commerce technologies such as virtual marketplaces (e.g. Intelysis, MySAP, SAPHIRE, and TradeMatrix.) As will be further described below, the Seller 120 and Buyer 130 workstations preferably communicate with one or more of the respective general ledger, administrative, accounting and manufacturing systems of the Seller 120 and Buyer 130.

As the communications between the Seller 120 and Buyer 130 on one side and Trade Manager 150 and TradeDoc 100 on the other side include financial and other proprietary information, appropriate security mechanisms are employed by TradeEDI 125 to protect these communications. In the direct dial and private network embodiments, security is enhanced by the private nature of the connection. In the public Internet embodiment though, extra security precautions must be taken. These security measures include for example authentication, encryption and non-repudiation. In authentication, Certifying Authority (CA) software is used to authenticate that information electronic communications are being sent by and received from the proper party without tampering and to further ensure that the communication cannot be repudiated. Furthermore, all communications are encrypted to prevent unauthorized access to the data contained in the communication. In one embodiment, Public Key technology is used for encryption, authentication and non-repudiation. As appreciated by those skilled in the art, the authentication, encryption and non-repudiation systems operate in accordance with the appropriate ANSI and ISO standards and guidelines.

Figure 2:
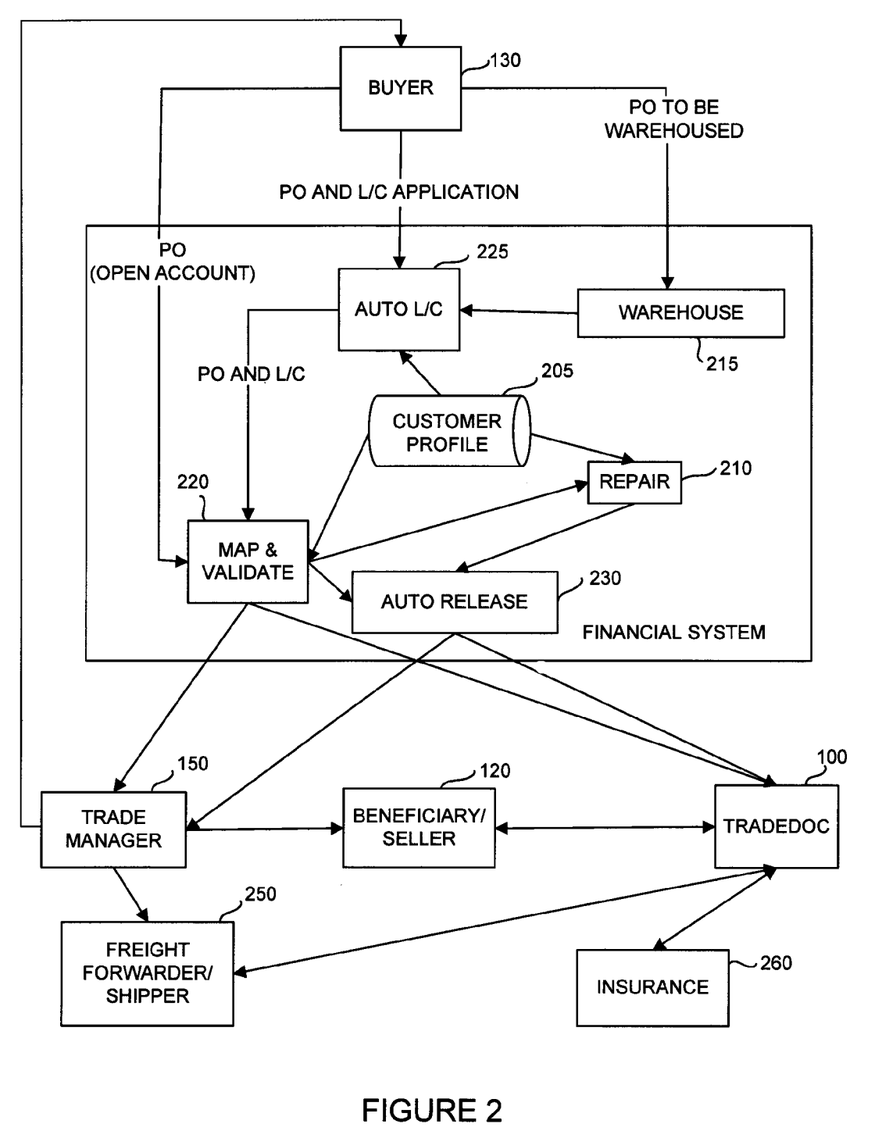
FIG. 2 depicts an overview of the functions performed by the various portions of the system of the present invention.

FIG. 2 illustrates in more detail the components and the processes of the present invention. The are essentially three phases to the process, Initiation, Tracking and Payment. FIG. 2 illustrates the initiation phase when the buyer is a customer of the financial institution operating the system. In the first phase, an application for an L/C and/or a PO from the Buyer 130 is received and processed by Financial System 175. In the second phase, the goods are manufactured, picked or procured and shipped, and all of the documentation required for this process is generated by TradeDoc 100 as is further illustrated in FIGS. 3A and 3B. In the final phase, payment and collection pursuant to the L/C or open account takes place. The payment process is further illustrated in FIG. 4. Each action in all of the phases is tracked by Trade Manager 150 which is accessible to all of the parties involved in the transaction (as noted below, certain information in Trade Manager 150 is accessible only to certain parties based on agreement between the parties).

As illustrated in FIG. 2, the process is initiated by the Buyer 130 transmitting to the bank either a PO by itself, or a PO and an application for an L/C. In a preferred embodiment, the documents are received from the Buyer 130 in electronic form, either through the Internet or other electronic communication means. Alternatively, the documents can be received in paper form and manually keyed or scanned in by bank personnel. In one embodiment of the present invention illustrated in FIG. 2, POs that are received from the Buyer 130 are stored (warehoused) by the Financial System 175 in a data warehouse 215 for subsequent grouping by the customer's business rules into one or more L/Cs. This is an attractive service to Buyer's 130 who do not want to develop or purchase an L/C system to track and monitor their L/Cs and the associated POs. As described above, certain trade transactions do not require an L/C and in these types of transactions the Buyer 130 merely sends the PO which initiates an Open Account transaction in the Financial System 175.

When electronic files are received from a Buyer 130, TradeEDI 125 (not shown in FIG. 2) translates the incoming data and utilizes the customer's profile contained in database 205 to map the data into the Financial System 175. This translation and mapping is performed for both L/C transactions and Open Account transactions. If the Buyer 130 has requested that the bank create an L/C from the PO, the L/C is automatically generated by an Auto L/C module 225. Auto L/C uses the PO information from the Buyer 130 and a preestablished customer profile for the Buyer 130 contained in database 205. The profile for the Buyer 130 contains standard L/C templates used by the Buyer 130 including standard L/C text and terms and conditions used for the particular Seller 100 involved in the trade transaction. The L/C generated by the Auto L/C 225 is customized based on the PO information and the buyer profile. For example, if the PO indicates a particular Seller 120, the Buyer 130 and Seller 120 can have a set of agreed upon terms and conditions which are reflected in the buyer profile. The terms and conditions with respect to a different Seller 120 might be different, and these differences are reflected in a different standard template for use with transactions involving that Seller 120. Each of the templates are stored in the buyer profile in database 205. Furthermore, different terms and conditions are generated depending on the goods, amounts, delivery dates . . . contained in the PO.

Financial System 175 provides for data validation utilizing the preestablished terms and conditions for the beneficiary (e.g., seller) and other parties contained in the Buyer's 130 profile in customer profile database 205. The data from the customer profile 205 and the Financial System 175 required data are compared to the incoming data from the Buyer 130 to ensure completeness and to meet the required UCP code. If there are no discrepancies, the Financial System 175 automatically performs a credit check with respect to the Buyer 130 and creates the L/C in the Auto Release process 230 (also known as straight through processing). This process requires no manual processing. If there are discrepancies found between the data from the Buyer 130 and the data in the customer's standing profile 205, the Financial System 175 sends the transaction to Repair 210 for manual review and potential repair or clarification with the Buyer 130. The Financial System 175 highlights the discrepancies to ease the review process.

Once the discrepancies have been resolved, or if there are no discrepancies, Auto Release 230 updates each of the database in Trade Manager 150 and if the Seller 120 is a part of the global supply chain network of the Buyer 130, a customer, or a customer of the bank's trading partners, the information will be sent to TradeDoc 100 to reflect the status of the issued L/C. Trade Manager 150 notifies the Seller 120 (or its advising bank or other agent) of the issuance of the L/C by the which the Seller 120 can commence its manufacturing/picking, procurement and shipping operations.

As described above, certain transactions known as Open Account transactions do not require a L/C and the PO alone forms the initiating documentation for the transaction. In this case, the PO is first validated (for consistent and complete information as described above) and mapped by the Financial System 175 into its own internal database for Financial System 175 tracking purposes. Once this validation and mapping has been completed, the PO information is transmitted to Trade Manager 150 and TradeDoc 100 for inclusion in the databases for those modules. Trade Manager 150 then notifies the Seller 120 (or its agent) of the issuance and receipt of the PO by the which the Seller 120 can commence its manufacturing/picking, procurement and shipping operations.

In an alternative embodiment of the present invention, the Buyer 130 can use a different banks to issue the L/C. In this embodiment, the Buyer 130 can establish agreements with all its banking providers to use TradeEDI 125, Trade Manager 150 and TradeDoc 100 to service all of its trade operations. The operator of the system of the present invention in this embodiment is operating as an outsource contractor and does not have any responsibility as an issuing or advising bank. In this embodiment, the Buyer 130 would also establish similar agreement with its vendors to utilize TradeEDI 125, Trade Manager 150 and TradeDoc 100. This would allow the Buyer 130 to have all the purchase and payment information in one location so that it can manage its global supply chain more efficiently. The Buyer 130 creates an electronic L/C application via either Trade Manager 150 or TradeEDI 125 and selects its designated issuing bank. The L/C application and PO information is mapped and validated using the buyer's customer profile into the Financial System 175. The complete L/C transaction is sent to Trade Manager 150 to allow the issuing bank to review and approve the transaction. The L/C data as well as the terms and condition can be downloaded by the issuing bank to interface with its internal financial system. The approval process can be either a single or multi level approvals. The number of approvers can also depend on dollar amount of the L/C. Once the designated issuing bank approves the transaction on Trade Manager 150, the L/C is released and issued by the designated bank to an advising bank or to the Seller 100. If there is an advising involved, the L/C will be sent by the Financial System 175 to the designated advising bank via SWIFT, Telex or mail. The issued L/C information can be downloaded from Trade Manager 150 or be sent by TradeEDI 125 to the designated issuing bank to update their internal financial systems. The L/C information is made available only to the L/C issuing bank and the Buyer 130. If the issuing bank and the Buyer 130 have an agreement with the Seller 100 and other related trading partners, the L/C information on Trade Manager 150 can be also access by these parties. The L/C and PO information are transmitted to TradeDoc 100 for trade documents preparation and can also assist the Seller 100 managing its L/Cs.

Regardless of whether the operative document is a PO or a PO or and L/C, all of the information from these documents is included in the Trade Manager 150 database. The most significant part of Trade Manager 150 is a database (relational, object oriented or a combination of both), business rules and customer profiles which allows for data entry, amendment, query and viewing. In the preferred embodiment, each record is based on an L/C and contains data with respect the following fields: L/C number, PO number, beneficiary name (e.g., Seller 120), beneficiary address, beneficiary country, ship to party name (optional), ship to party address (optional), goods description (optional), item number or style number (optional), color (optional), size (optional), shipping term (optional), port of loading (optional), country port of loading (optional), port of destination (optional), country port of destination (optional), earliest ship date (optional), latest ship date, mode of transportation (optional), quantity, units of measure for quantity, currency, unit price, unit of measure for unit price (optional if different from unit of measure for quantity) total amount, Buyer 130's SKU number (optional), Seller 120's SKU number (optional), manufacturer's SKU number (optional), division number (optional), tenor type (optional), tenor day (optional), tenor code (optional), and status. The above list is not exhaustive and particular implementations of the present invention may use more or less than the number any types of above described data fields. Furthermore, the primary index of the preferred database is the L/C, while other implementations can have records based on a PO.

Although the above discussion has referred to a single PO from the Buyer 130, in practice, several POs (each PO containing multiple items) can be covered by a single L/C or be considered part of an Open Account trading transaction. Trade Manager 150 provides the customer's profile with its associated vendor profiles and customer business rules in order to correlate between an L/C and all of the POs covered by the L/C. The bank typically wants to keep track of the status of the trade operation from an L/C point of view (since the L/C is the operative financial document), while the Buyer 130 and Seller 120 are more concerned with the status of the PO and its line items since these items represent the goods. In order to accommodate the different parties, Trade Manager 150 provides different views of the database. In a preferred embodiment, views are provided, by beneficiary (Seller 120) by L/C or by PO. In addition, a Buyer 120 may put more descriptive information on a L/C for merchandise inventory than contained in the PO in order to protect themselves (e.g., fabric content, item category (i.e., toys), etc.).

In response to a query by a user (e.g., a Buyer 130) the records from the Trade Manager 150 database are displayed to the user in a table format. For example if Buyer 130 makes an inquiry of the Trade Manager 150 database about all transactions involving beneficiary company XYZ (i.e., a Seller 120) Trade Manager 150 generates a tabular report that lists, for every transaction with company XYZ, the PO number, the L/C number, the quantity of goods, the unit price, the total PO amount and the current status. It is appreciated that the information which can be displayed by Trade Manager 150 can be tailored to individual users. For example, a particular Buyer 130 might be more concerned with the proposed delivery dates than it is concerned about the unit price. These delivery dates can easily be incorporated in the report for that Buyer 130. As described above, in the preferred embodiment, similar tabular views are available for sorting by L/C and/or PO.

In an aspect of the integrating TradeDoc 100 and Trade Manager 150, the Seller's 120 information can be made available to the Buyer 130. If the Buyer 130 and Seller 120 agree, information such as the manufacturer's status information, shipping status information and other such information can be made available to the Buyer 130 to monitor and track. This will allow the Buyer 130 to manage the inventory and the distribution of goods or to potentially redirect a shipment in the event of a change of circumstances.

One of the main tasks of Trade Manager 150 is to keep track of the history of the POs during the life of the respective L/C. If the PO or L/C is updated as a result of an amendment or payment, the value of the record is not overwritten, but rather Trade Manager 150 creates amendment or payment record which is then linked back to the base PO and/or L/C records. When viewing data from the Trade Manager 150 database, the user is given the option to zoom in on a selected record. As the user zooms in, Trade Manager 150 displays the details of the record, as well as the history (i.e., all amendments and payments). In a preferred embodiment, a running balance of both the quantity and amount is displayed under the history section.

Trade Manager 150 allows for file export by appropriately authorized users. Standard formats are supported such as ASCII, Excel™ and Lotus™ files. The export can take place by any of the means described above such as through the Internet or other private Electronic Data Interchange (EDI). The user can select from a list of all available data elements and specify the order by which each of the data elements is to be exported. Additionally, user can specify additional selection criteria such as date range, balance quantity or beneficiary. Trade documents, print files and electronic message associated with an L/C or PO transaction are available to be viewed by both the Seller 120, the Buyer 130, and other trading partners. Furthermore, Trade Manager 150 supports scheduled downloads of information to a user. This feature is attractive for Buyers 130 and Sellers 120 who maintain internal systems which require updating by the information available from Trade Manager 150. Trade Manager 150 also provides archiving services for its users. Typically a user would not want any records archived until the trade transaction embodied in the records has been completed (e.g., expired, canceled or fully drawn).

As briefly described above, Trade Manager 150 provides several security mechanisms to ensure confidential communications between the system and it users. These security mechanisms include encryption, authentication, non-repudiation. Furthermore, each user is provided with a profile which includes the data to which the user has authorized access. Naturally, Trade Manager 150 prevents a particular customer from viewing the trading transactions of another customer. Trade Manager 150 provides a further level of access security in which a customer can designate which of its employees can view particular data. For example an exporter (Seller 120) can designate that its manufacturing employees may view the PO data but not L/C financial data associated with a trade transaction. In the preferred embodiment, all of the users (other than the bank personnel) have read only rights with respect to the data stored in Trade Manager 150. This security feature ensures that no one can intentionally, or more likely, unintentionally alter the data contained in the database. If a user discovers an error or other discrepancy in the database, the bank operators are notified and have the ability to modify the data to correct the error.

As described above, in the preferred embodiment of the present invention users access Trade Manager 150 using standard browsers and the Internet. One of the significant aspects and advantages of the present invention is that through the use of the Internet, geographically distributed parties to the transactions can each log onto Trade Manager 150 and instantly determine the status of a particular transaction. This is a quantum leap of innovation over the prior art in which determining the status of the transaction often involves several phone calls or faxes over several different time zones.

In parallel to the population of the Trade Manager 150 database, a similar database in TradeDoc 100 is populated with the transaction data. In the preferred embodiment, each of Financial System 175, Trade Manager 150 and TradeDoc 100 maintain their own separate databases. One technical reason for this implementation is that performance is enhanced with separate databases since a load on the database by one system does not impact use of the database by the other systems. One requirement of maintaining separate databases is that the data in each of the databases must be synchronized. One other reason for maintaining separate databases is the each of the systems Financial System 175, Trade Manager 150 and TradeDoc 100 can be operated separately and independently. For example, some Sellers 100 might want to use only TradeDoc 100 for managing their own internal processes without the need for any of the functions provided by Financial System 175 or Trade Manager 150. In this embodiment, a facility incorporating just TradeDoc 100 and its separate database can be established for this Seller 100. In an alternative embodiment, a single common database can be provided for Financial System 175, Trade Manager 150 and TradeDoc 100. In this embodiment, no synchronization of data is required, but there may be performance impacts as described above. However, in a small site, all of the database can be combined into a single database.

As briefly described above, TradeDoc 100 is a tool for managing the trade process from the period from the advice of the L/C and/or PO to te Seller 120, to the point of the collection of the payment for delivered goods. As described above, certain Sellers 120 can have an agreement with the bank to use TradeDoc 100 to generate trade documentation without the bank having the capacity as either the issuing or advising bank. This is possible since TradeDoc 100 is typically operated by the document preparation unit of the bank, which is a separate from the L/C department which manages the Financial System 175. Furthermore, a Buyer 130 can mandate in its agreement with the Seller 120 that the Seller 120 use TradeDoc 100 in managing its documentary processes. TradeDoc 100 can have the same information as Trade Manager 150 for those Sellers 120 that are the recipient of the L/Cs or POs directly from the Buyer 130 or the Buyer's 130 issuing bank or the Seller's 120 advising bank. In this embodiment, both the TradeDoc 100 and Trade Manager 150 databases are updated with the L/C and/or PO information supplied directly from the Seller 120 or from the advising or issuing bank. This includes any amendments and payment information.

Figure 3A:
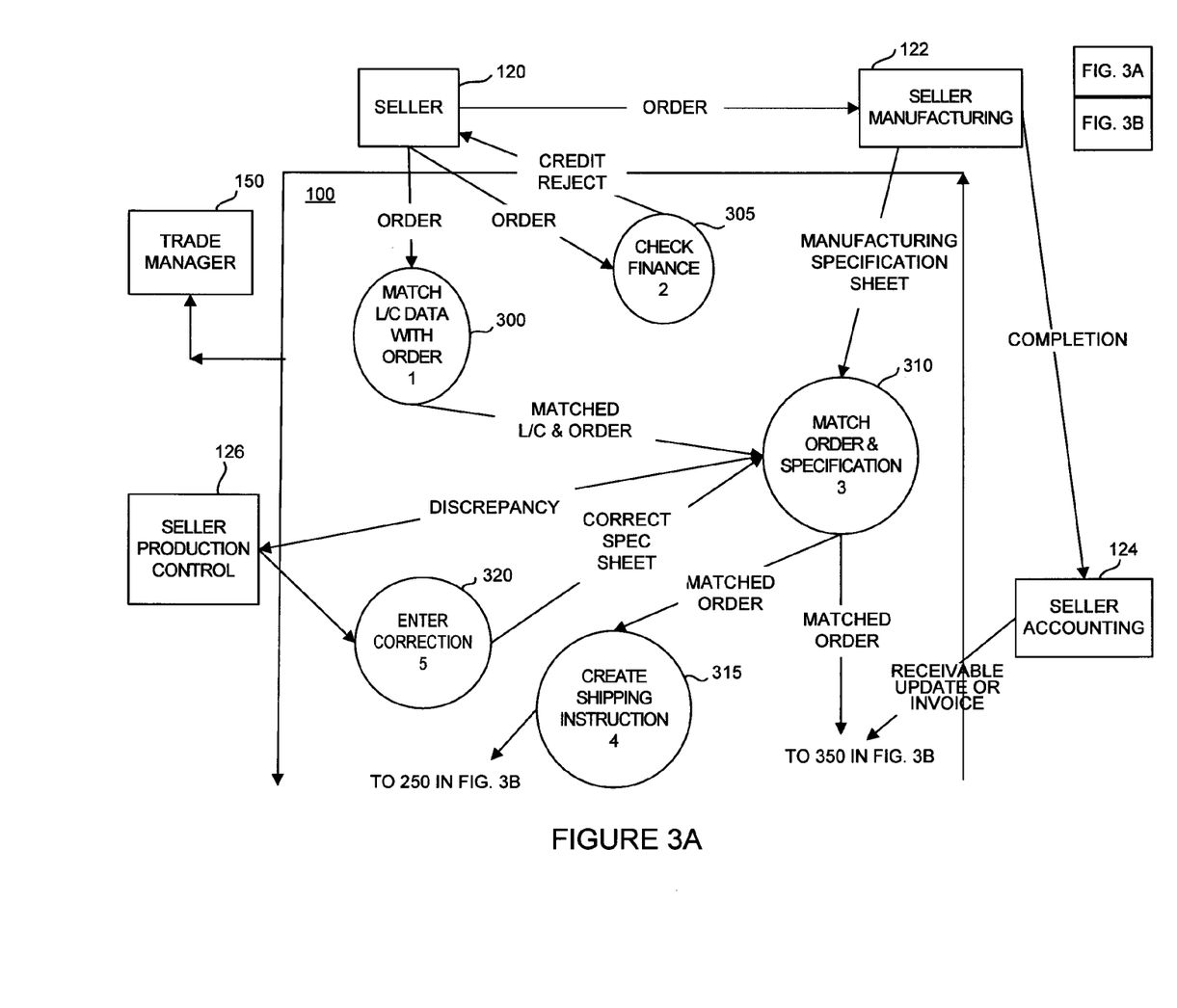
FIGS. 3A and 3B illustrates process executed by the TradeDoc component of the present invention.
Figure 3B:
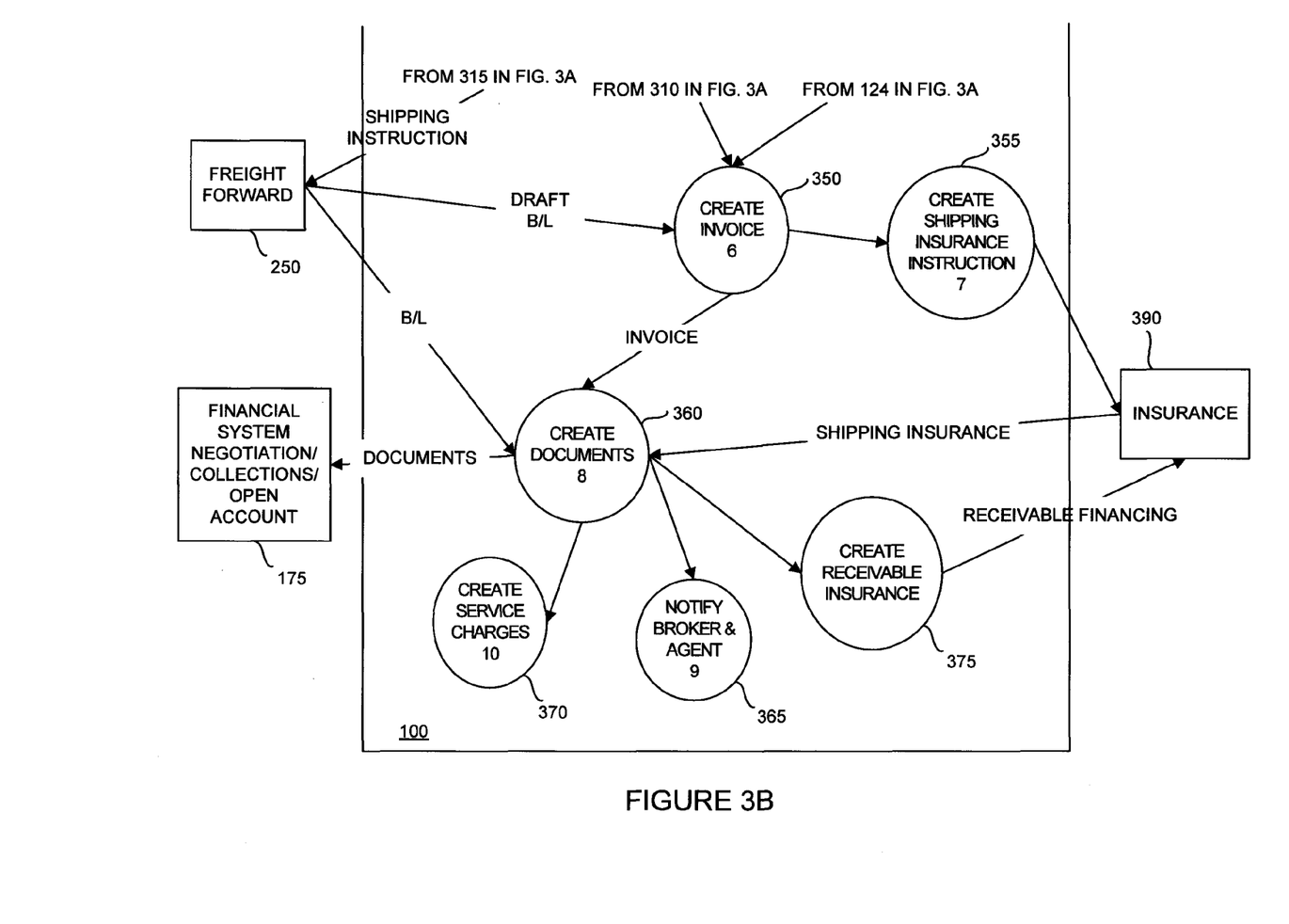

In the preferred embodiment illustrated in FIG. 2, TradeDoc 100 is operated by the financial institution on behalf of its clients, the Sellers 120, but access to the TradeDoc 100 system can be granted to other licensed users (e.g., Buyers 130) if the Seller 120 in the transaction so desires. Some Sellers 120 would not want to let the Buyer monitor the internal status of the Seller's process, but some Buyer's might on insist on such monitoring capability. A full description of the operation of the TradeDoc 100 system is found below in connection with FIG. 3, but as generally depicted in FIG. 2, TradeDoc 100 generates all of the documentation required by the trade transactions and interacts with third parties such as forwarders, brokers, customs or other government agencies, Shippers 250, Insurance Providers 260 and other parties in the supply chain in order to ensure that the process flows smoothly and is not held up due to incorrect or insufficient documentation.

FIGS. 3A and 3B illustrate the operation of TradeDoc 100 in assisting a Seller 120 in managing the process of generating the documentation required to complete the trade operation. As is further illustrated in this Figure, TradeDoc 100 also assists the Seller 120 in its internal manufacturing processes by ensuring the goods manufactured conform to the L/C and or PO. Prior to describing the TradeDoc 100 process, a brief discussion of the database used by TradeDoc 100 is warranted. The database in TradeDoc 100 is similar to the database maintained in Trade Manager 150. Each record in TradeDoc 100 preferably contains the following fields: Issuing bank L/C number; Advising bank L/C number; Issuing bank name and address; Advising bank name and address; Beneficiary name and address; L/C currency; L/C amount; L/C issuing date; L/C expiry date; L/C tenor; Latest shipment date; Merchandise Inventory; Transhipment allowable indicator; Partial shipment allowable indicator; Special Instruction; Reimbursement Instruction; and Amendment Number. As can be seen some of the fields in the TradeDoc 100 database are the same as in the Trade Manager 150 database (e.g., L/C number) while others (e.g., Transhipment allowable indicator) are only required for the generation of documentation by TradeDoc 100 and are accordingly not tracked by Trade Manager 150.

As TradeDoc 100 receives data for the fields described above with respect to a trade transaction, it creates an L/C record in the TradeDoc 100 database. From the terms of the L/C, TradeDoc 100 is able to create a list of the required documents as will be described below with respect to FIGS. 3A and 3B. In addition, TradeDoc 100 parses and breaks down the L/C terms and conditions into attributes and processing rules in order to make the decision process with respect to document requirements more automated. In addition to an L/C record for each transaction, TradeDoc 100 can create (based on the customer's standard instructions) one or more 'Sales Order' record(s) from the 'Merchandise Inventory' data contained in the L/C or PO (note one L/C or PO can have more than one 'Sales Order' associated with it). As will be more fully described below, TradeDoc 100 allows a Seller 120 to keep track of the transaction on the basis of its own Sales Orders, rather than the PO or L/C issued by the Buyer 130. If the data originates from the Buyer 130, or the Buyer's issuing bank or advising bank, a Sales Order record is set up with a status of pending since TradeDoc 100 requires that the beneficiary (Seller 120) provide the details for the Sales Order record (e.g., such as 'Sales Order Number'). If the data originates directly from a Seller 120, the data is input and the status of the Sales Order record is set to 'Sales Order Confirmed'.

Reflecting the nature of commercial trading, amendments to L/Cs or POs occasionally occur and TradeDoc 100 is accordingly able to process such amendments. An amendment to an L/C or PO either comes directly from the Buyer 130 or the advising bank either in electronic or hardcopy form. Preferably, the amendment to the L/C or PO contains data for all of the fields as described above with respect to an original advisement of the L/C or PO. In an amended L/C or PO, the data reflects the amended terms. Upon receipt of the amended L/C or PO, TradeDoc 100 retrieves the original L/C or PO record from the TradeDoc 100 database based on the following matching criteria: Issuing Bank L/C number; Advising Bank L/C number; and the status of the L/C is not 'Cancel'. If no matching record is found, or if the record is found but the wrong status is detected on the matched L/C, the transaction is flagged on an exception report and process of amending the L/C is terminated. If the status of the L/C is 'Expired' or 'Bookoff' and the 'Expiry Date' in the proposed amended L/C is still earlier than the processing date, the transaction is flagged on an exception report and the amendment process is terminated pending manual rectification by TradeDoc 100 operators.

In processing an amended L/C or PO, TradeDoc 100 provides the following validations: a newly added Sales Order should not exist; a deleted or amended Sales Order must exist; and each amended Sales Order is validated against all its related 'Invoices' (if any) to check the remaining balance. If the above validation fails, TradeDoc 100 can either display a warning message and proceed with the process or display an error message and terminates the processing pending manual rectification. As with original L/Cs, if the supplied data is incomplete, it must be manually repaired.

Once an amended L/C has been validated, the L/C record is updated based on the amendment. Furthermore, the list or required documents (generated from the L/C and/or PO) is updated based on the revised L/C terms if needed. This may mean adding new document to the list, deleting old document from the list and/or amending the number of copies required for any existing document on the list. Finally, the Sales Order record(s) are updated if the Merchandise Inventory of the L/C is amended. This may mean adding new Sales Orders, deleting old Sales Orders and/or amending element(s) of any existing Sales Orders. If the data for the amended L/C/ came from anyone other than the Seller 120, any new or amended Sales Order must be confirmed by the Seller 120. Similar to amendments, TradeDoc 100 is capable of processing canceled L/Cs. It must be noted that TradeDoc 100 only amends the trade documents generated pursuant to the L/C and/PO or an amended L/C and/or an amended PO and does not amend the PO or L/C itself.

Returning to FIGS. 3A and 3B, these Figures illustrate both the process executed by TradeDoc 100 as well as the interactions of TradeDoc 100 with other systems (e.g., Trade Manager 150). The starting point for the process illustrated in these Figures is that the terms of the L/C and/or the PO have been agreed upon and included in the TradeDoc 100 and Trade Manager 150 databases, and it is presently the obligation of the Seller 120 to manufacture and deliver the goods according to the agreement between the parties. The Seller 100 is advised of either the L/C or the PO electronically via Trade Manager 150 or TradeEDI 125.

As described above with respect the TradeDoc 100 database, the operative document from which the Seller 120 manufactures its goods is an internal document known a Sales Order. Although not specifically illustrated in the Figures, TradeDoc 100 is capable of generating the Sales Order for the Seller 120 from the L/C and/or PO. Alternatively, the Seller 120 itself can generate the Sales Order. As shown in FIG. 3A, TradeDoc 100 communicates with Trade Manager 150 in order to keep current the status of the transaction as reported in Trade Manager 150. As milestones are reached in the process as described below, TradeDoc 100 provides Trade Manager 150 with an updated status. As described above, this status is available to the Seller 120 and to the Buyer 130 if agreed to by the Seller 120 and the Buyer 130.

Once the Sales Order has been generated, either by the Seller 120 itself or by TradeDoc 100, TradeDoc 100 in step 300 compares the details of the Sales Order to the details of the L/C and/or PO. This comparison is to verify that the Sales Order from which the Seller 120 complies with all of the requirements of the L/C and/or PO. For example, the L/C might require the manufacture and delivery of 1,000 units, while the Seller 120 might have mistakenly generated a Sales Order specifying 10,000 units. The check in step 300 will ensure that this type of mistake is caught and corrected prior any further, potentially costly, actions by the Seller 120.

Step 305 illustrates an optional function provided by TradeDoc 100. In practice, a Seller 120 may be in a position to provide financing, "supplier credit" to the buyer. If this is the case, the Seller checks the availability of credit under a preset credit limit for that particular Buyer 130. Typically, a financial institution performs the actual monitoring of the availability of credit for the Buyer 130 an TradeDoc assists the financial institution in making this determination by supplying the terms of the transaction. In step 305, the Sales Order is used in the determination if financing is available. Although not illustrated in FIG. 3A, the determination with respect to financing is either made by the bank operating TradeDoc 100 or by a third party source of financing. The resulting financing determinating is reported back to the Seller 120.

At the same time the Sales Order is provided to TradeDoc 100, the Seller 120 provides the same Sales Order to its Manufacturing division 122. From the Sales Order, the Manufacturing arm 122 generates a manufacturing specification sheet from which its manufacturing employees will manufacture the actual goods. The Sales Order itself cannot efficiently be used by the manufacturing employees in their daily operations and planning functions. Although FIG. 3A specifies that the Manufacturing division 122 generates a manufacturing specification sheet, if the goods have already been manufactured and are in inventory (e.g., the Seller is a distributor and not a manufacturer), the Manufacturing division 122 can provide an inventory pick sheet that indicates the items which will be picked from inventory in order to satisfy the Sales Order.

The manufacturing specification sheet is forwarded to TradeDoc 100 which compares the Sales Order with the manufacturing specification sheet. This comparison in step 310 detects any deviation between the description of the goods requested by the Buyer 130 (embodied in the PO or L/C) and the description of the goods which the Manufacturing division 122 plans on making available in fulfillment of the Buyer's 130 request. Again, the comparison of step 310 is intended to discover any errors in the documentation being used by the Seller 120. Such errors can result in the manufacture of the wrong type or number of goods which in turn results in lost profits for the Seller 120. For example, if the Buyer 130 has ordered 10,000 blue units and the Manufacturing division 122 mistakenly manufactures 10,000 red units, the Seller 120 first of all has to go back and manufacture the originally requested blue units, most likely resulting in a delay in shipment, but the Seller 120 is additionally left with 10,000 red units in stock.

If TradeDoc 100 detects a discrepancy between the manufacturing specification sheet and the Sales Order, it notifies the Seller's production control 126. It is preferred that the matching step 310 occurs before any required manufacturing or picking takes place. As the comparison performed by TradeDoc 100 in step 310 is virtually instantaneous, the Seller 120 must only ensure that the specification sheet is generated and transmitted to TradeDoc 100 at some point before manufacturing begins. In step 320, the Seller's production control 126 makes the corrections to the manufacturing specification sheet and forwards the corrected sheet back to TradeDoc 100 where a confirmation comparison of the specification sheet is made with respect to the Sales Order. If the same or additional errors are detected, an iterative process can take place between TradeDoc 100 and the Seller 120's production control 126 system or personnel. Once no discrepancies are detected, the Manufacturing division 122 uses the verified manufacturing specification sheet to commence and eventually complete the manufacturing of the goods.

After completion of the comparison of step 310, the matched Sales Order is used by TradeDoc 100 to create shipping instructions (e.g., draft bill of lading or airway bill) in step 315. The process of arranging for the shipment of the goods takes place in parallel to the process of manufacturing of the goods. The draft bill of lading or airway bill or other shipping instructions are generated from the TradeDoc 100 database which includes, but is not limited to the following data with respect to shipping: Name of Applicant/Buyer 130; Currency; Amount; Tenor Information; Actual Shipment Date; Merchandise Inventory—Description and Quantity of Goods; Purchase Order/Contract Number; Name, Address and Telephone Numbers of the Third Party Documents, (e.g., Inspection Certificate, if any, Contact Person, if possible); and Special Instruction, if any. Prior to the present invention, the Seller 120 had to manually generate the shipping instructions which again provided the possibility of error, either human or systemic.

Once the shipping instructions document has been generated by the automatic process in step 315, TradeDoc 100 transmits the shipping instructions (e.g., packing lists) to the Freight Forwarder (Shipper) 250 as illustrated in FIG. 3B. Again, in the preferred embodiment, the Internet is used as the communication media for the transmittal of the shipping instructions from TradeDoc 100 to the Freight Forwarder 250. In response to the shipping instructions from TradeDoc 100, the Shipper 250 returns a draft Bill of Lading (B/L). The B/L is the commercial document used by Shippers 250 when transporting goods. In an alternative embodiment of the present invention, TradeDoc 100 can generate the draft B/L which is then transmitted to the Shipper 250 for approval. Although not separately illustrated in FIG. 3B, TradeDoc 100 in step 350 checks the draft B/L from the Shipper 250 in order to verify that it conforms with the details of the shipping instructions previously generated by TradeDoc 100.

In step 350, TradeDoc 100 automatically generates a invoice using the matched order from step 310 (see FIG. 3A) and from a receivable update or draft invoice from the Seller's 120 Accounting system 124 (see FIG. 3A). As shown in FIG. 3A, the Seller 120's Accounting department 124 only generates the receivable update or draft invoice only after the Seller's Manufacturing department 122 has notified Accounting 124 that the manufacturing of the goods has been completed. The receivable update or draft invoice reflects the goods that were actually manufactured by the Manufacturing department 122. TradeDoc 100 verifies that the receivable update or draft invoice from the Seller's 120 Accounting system 124 is in accordance with the matched Sales Order resulting from step 310. Again, this verification by TradeDoc 100 ensures that there are no human or systemic errors in the receivable update or draft invoice. If any errors are detected in the documentation from the Accounting System 124, they are corrected manually. Once TradeDoc 100 has verified that the data from the Accounting department 124 is correct, TradeDoc 100 generates the actual invoice that forms part of and is used to create the remainder of the documentation required to complete the trade transaction.

The invoice generated in step 350 is used by TradeDoc 100 in step 355 to automatically generate an shipping insurance instruction. The shipping insurance instruction necessarily contains the pertinent information with respect to the goods that are being sought to be insured. The insurance instruction is sent (again preferably through the Internet) to an Insurance Provider 390. The Insurance Provider 390 in turn generates and transmits back to TradeDoc 100 the documentation evidencing the shipping insurance policy on the goods to be shipped.

In step 360, all of the final export documents required for completing the trade transaction are automatically generated by TradeDoc 100 using the existing data in the TradeDoc 100 database, the invoice from step 350, the final B/L from the Freight Forwarder 250 and the insurance document from the insurance Provider 390. The final formal documents generated include, but are not limited to invoices, packing slips, B/L, insurance certificate and certificate of analysis for example. In some cases, customers will use independent certificate broker/agents to certified the goods shipped, e.g. SGS. TradeDoc 100 provides them with the list of good's from the invoice/packing slip and the inspection will provide certified message after the inspection is completed. This can be done on a electronic message or paper certificate/stamp marking.

In step 375, the documents generated in step 360, including the bill of lading or airway bill can be used by TradeDoc 100 to generate a request for receivables insurance. This request is forwarded to an insurance provider 390 which can be the same or a different insurance provider that provided the shipping insurance. In step 365, TradeDoc 100 is capable of forwarding the final documents to a broker or agent of the Seller 120 who requires advance knowledge of these documents. An example would be a local agent who is responsible for ensuring that the goods clear customs. In step 370, TradeDoc 100 generates the service charges to be applied to the Seller 120 for the services performed in generating all of the formal paperwork. In a preferred embodiment, these service charges are presented to the Seller 100 in electronic form on one of its workstations. The presentation of the service charges includes a "Pay-it" button by which the Seller 120 can click on this button and the Seller's 120 account (e.g., a Demand Deposit Account) is automatically debited for the amount of the service charges.

In some countries like Hong Kong, the local government requires any imports or exports to have a declaration be filed with the Trade Department of that country. Using all of the information already in the TradeDoc 100 database, TradeDoc 100 is able to generate such an export declaration which can then be filed with the Hong Kong Trade Department (again, preferably through electronic communication means). In addition, textile export to the United States (U.S.) requires an export quota filing. Once the interface is known, TradeDoc 100 is capable of electronically interfacing with the local government system in order to file the required export documentation required by the local government. Textile Imports into the U.S. require a U.S. visa. TradeDoc 100 can automatically generate the required documentation and interface with either the U.S. custom system or a local government system that has an interface with the US Custom system. For example, the Hong Kong Government Trade Department has a link to the U.S. Custom system to facilitate obtaining the required U.S. Visa. Some commodity exports, i.e., dairy products from Australia requires an Australian government agency to certify the product. TradeDoc 100 is capable of interfacing with the proper government agency to obtain the electronic certification. Commodity exporters are often required to provide a certificate of analysis to specify the quality/purity of the product, i.e. Aluminum. Again, TradeDoc 100 can interface with the exporter or a third party certifier in order to obtain the certificate of analysis.

The final step in the process is that all of the final export documentation is transmitted to the issuing bank to start the collection process. In the collection process, the final documentation must be presented either to the Buyer 130 directly under and Open Account transaction or to the Buyer 130's bank (the issuing bank) under an L/C transaction. One significant advantage of the present invention is that since all of the final documentation is in electronic form, the documents may be printed (using the corporate intranet described above) at the location of the bank which is closest to either the Buyer 130 or the Buyer 130's bank. This remote printing capability significantly reduces the time required for presenting the papers for collection and totally eliminates any possibility of the documentation becoming lost or otherwise mishandled. This additionally shortens the time for collection. If the customer and banks are part of the network, the documents can be posted on the Web site for retrieval by the proper parties specified on the L/C or purchase agreements.

Figure 4:
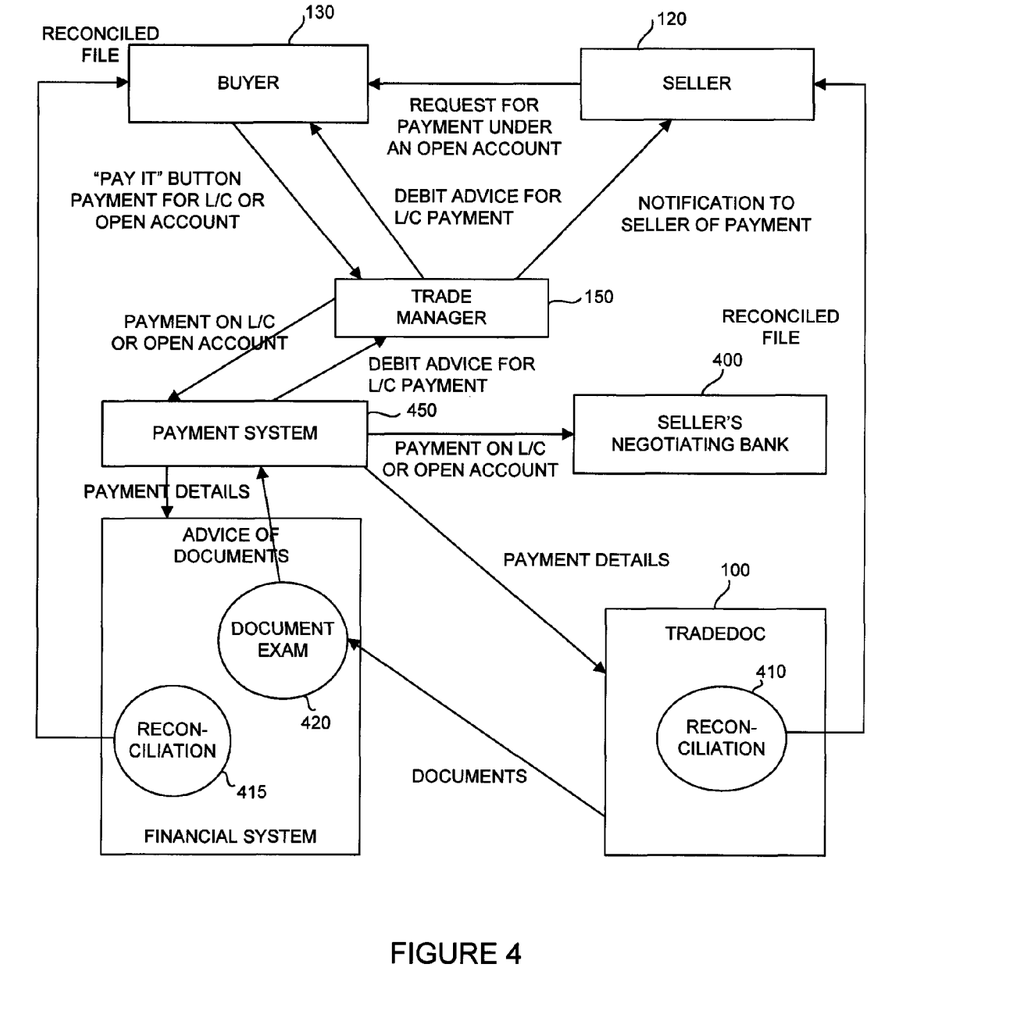
FIG. 4 depicts the payment and reconciliation functions performed by the present invention.

FIG. 4 illustrates the collection process either on an Open Account or L/C transaction. The present invention assists a Buyer 130 in managing its accounts payables and a Seller 120 in managing its receivables. On behalf of the Buyer 130 the system will match the invoice to the PO and provide an electronic file, or other format, to update the Buyer's 130 internal accounting and record keeping systems. On behalf of the Seller 120, the system will match an incoming payment from the Buyer 130 to an outstanding invoice and provide an electronic file, or other format, to update the Seller's 120 internal accounting and record keeping systems.

As illustrated in FIG. 4, TradeDoc 100 electronically transmits all of the final trade documents to the Financial System 175 for payment processing either on an Open Account or an L/C. The Financial System 175 once again validates and checks the trade documents in step 420 to ensure there are no discrepancies between the documents and the L/C or PO. If the bank operating the Financial System 175 is not the issuing bank, the trade documents are sent to issuing bank (not shown), either electronically or in printed form, which in turn notifies the Buyer 130 that payment is due. If the bank operating the Financial System 175 is the issuing bank or maintains the Open Account for the Buyer 130, the Financial System 175 notifies a Payment System 450 of the bank of the receipt of the final trade documents. The Payment System 450 in turn, transmits a debit advice for the payment on an L/C to Trade Manager 150 which forwards the advice for payment to the Buyer 130. As alternatively shown in FIG. 4, the Seller 120 can itself advise the Buyer 130 of the request for payment on an open account.

In parallel to the advice of payment, the Financial System 175 is capable, if requested by the Buyer 130, of performing a reconciliation function on behalf of the Buyer 130. The reconciliation function performed by the Financial System 175 module matches the payment under the trade documentation with the outstanding L/C or PO (under an Open Account transaction). Since an L/C may contain multiple POs and both POs and L/Cs may refer to multiple invoices this is not a trivial task. The file resulting from the reconciliation process is forwarded to the accounting system of the Buyer 130 in order to complete/update its accounts payable records.

If the bank is the issuing bank or holds the open account, the Buyer 130 provides Trade Manager 150 with an authorization for payment. In response to this authorization for payment, the Payment System 450 debits the Buyer's 130 account (e.g., DDA) and forwards the payment to the Seller 120 or its bank 400. Again, as described above with respect to the service charges to the Seller 120, when the Trade Manager 150 advises the Buyer 130 of the payment, Trade Manager 150 can incorporate a "Pay-it" button to facilitate the authorization of the payment to the Seller 120.

If the Seller 120 is customer of the bank, once payment is made by either issuing or reimbursement bank, the payment is credited to the Seller's 120 account via the Financial System 175. The Payment System 450 transmits the payment details along with any fees that have been deducted to TradeDoc 100. TradeDoc 100 performs the function of reconciling the payment with either invoice details or line items detail for the Seller 120. The reconciliation function for the Seller 120 is performed by TradeDoc 100 as opposed to the Financial System 175 because the reconciliation for the Seller 120 is performed on a line item basis. The details of the line items from the Seller's 120 invoice are preferable maintained in the TradeDoc 100 database and not in the database for the Financial System 175. Alternatively, the Financial system 175 can perform reconciliation for the Seller 120 if all of the detailed information for the reconciliation is contained in the Financial System 175 database. As with the procedure describe above with respect to the Buyer 130, TradeDoc 100 transmits the reconciled information of receivable and fees to the Seller's 120 accounting system for updating it's receivable records. As described above, since the core business of Sellers 120 is manufacturing and selling goods, the reconciliation function provided by the present invention is very desirable.

One significant advantage of the present invention is that it can be packaged and labeled (i.e., white labeled) such that the users of the system do not know who is actually operating the system. For example, the system may actually be operated by bank A, but the user interface screens can be designed such that the user believes the system is being operated by bank B. In this manner, bank B is able to present this service to its customers with a user interface consistent with its corporate image and bank A enjoys the revenues it receives from bank B for the operation of the system. Furthermore, pieces of the present invention are able to be separately licensed and operated. For example, some Sellers 120 might only want the documentary functions provided by TradeDoc 100 and not require the Financial System 175, Trade Manager 150 or TradeEDI functions.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

What is claimed is:

1. An method for a buyer to pay a seller for a transaction via a bank, comprising:

receiving, from a buyer, an initiation document for a transaction with a seller, the buyer having agreed to open account services with the bank;

at least one computer processor retrieving a buyer profile for the buyer, the buyer profile comprising requirement information with respect to a trade operation;

the at least one computer processor notifying the seller of the initiation document and the requirement information;

the at least one computer processor generating at least one trade document required by the trade operation using the requirement information, wherein the at least one trade document comprises at least one of: a sales order, a manufacturing specification sheet, an invoice, shipping instructions, insurance instructions, a draft, a beneficiary certificate, and a transport document, wherein the invoice is generated using a matched sales order;

receiving, from the buyer, a payment instruction to the bank to make a payment to the seller for the matched sales order;

the at least one computer processor comparing the invoice to the matched sales order in order to determine any discrepancies;

the at least one computer processor correcting the invoice if there are any discrepancies, thereby generating a matched invoice;

receiving shipping instructions from a shipper via the network;

the at least one computer processor comparing the shipping instructions to the matched invoice in order to determine any discrepancies; and informing the shipper of the discrepancies whereby the shipper can correct the discrepancies and provide matched shipping instructions;

the at least one computer processor automatically generating shipping insurance instructions based on the matched invoice; and transmitting the shipping insurance instructions to an insurer;

receiving a certificate of insurance from the insurer; and the at least one computer processor generating at least one trade document using the certificate of insurance, the matched invoice and the matched shipping instructions.

2. The method of claim 1, wherein the transport document comprises a bill of lading.

3. The method of claim 1, further comprising:
the at least one computer processor generating a sales order in response to the initiation document.

4. The method of claim 3, further comprising:
the at least one computer processor comparing the sales order to the requirement information in order to determine any discrepancies; and
the at least one computer processor correcting the sales order if there are any discrepancies, thereby generating a matched sales order.

5. The method of claim 4, further comprising:
the at least one computer processor generating a manufacturing specification sheet based on the sales order;
the at least one computer processor comparing the manufacturing specification sheet to the matched sales order in order to determine any discrepancies; and
the at least one computer processor correcting the manufacturing specification sheet if there are any discrepancies, thereby generating a matched manufacturing specification sheet.

6. The method of claim 4, further comprising the steps of:
the at least one computer processor automatically generating shipping instructions based on the matched sales order; and
transmitting the shipping instructions to a shipper.

7. The method of claim 1, wherein the at least one trade document is transmitted electronically.

8. The method of claim 1, further comprising:
presenting at least one trade document to the buyer for negotiation via the network.

9. The method of claim 1, further comprising:
the at least one computer processor performing a reconciliation function on behalf of the buyer.

10. The method of claim 9, wherein the step of performing a reconciliation function on behalf of the buyer further comprises the step of reconciling a payment due under the trade documents against the requirement information.

11. The method of claim 1, further comprising:
receiving payment information reflecting a payment made by the buyer; and
the at least one computer processor performing a reconciliation function on behalf of the seller in response to the payment.

* * * * *